United States Patent
Mayer et al.

(10) Patent No.: US 11,738,402 B2
(45) Date of Patent: Aug. 29, 2023

(54) METHOD AND DEVICE FOR SCANNING A WORKPIECE SURFACE OF A METAL WORKPIECE

(71) Applicant: Fronius International GmbH, Pettenbach (AT)

(72) Inventors: Manuel Mayer, Edt bei Lambach (AT); Andreas Waldhoer, Pettenbach (AT); Josef Artelsmair, Wartberg (AT); Dominik Soellinger, Krenglbach (AT); Helmut Ennsbrunner, Pettenbach (AT); Andreas Hummelbrunner, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 362 days.

(21) Appl. No.: 16/624,051

(22) PCT Filed: Jun. 22, 2018

(86) PCT No.: PCT/EP2018/066798
§ 371 (c)(1),
(2) Date: Dec. 18, 2019

(87) PCT Pub. No.: WO2019/002141
PCT Pub. Date: Jan. 3, 2019

(65) Prior Publication Data
US 2020/0139474 A1   May 7, 2020

(30) Foreign Application Priority Data
Jun. 26, 2017  (EP) ..................... 17177839

(51) Int. Cl.
*B23K 9/12*   (2006.01)
*B23K 9/095*   (2006.01)

(52) U.S. Cl.
CPC ............ *B23K 9/125* (2013.01); *B23K 9/0953* (2013.01); *B23K 9/126* (2013.01)

(58) Field of Classification Search
CPC ...... B23K 9/0953; B23K 9/124; B23K 9/125; B23K 9/126; B23K 9/173; B23K 9/32
See application file for complete search history.

(56) References Cited

U.S. PATENT DOCUMENTS 4,970,362 A * 11/1990 Ono ....................... B23H 7/065
                                                         219/69.12
5,399,837 A    3/1995 Mangelsen et al.
(Continued)

FOREIGN PATENT DOCUMENTS

CN   102596480 A   7/2012
CN   103282153 A   9/2013
(Continued)

OTHER PUBLICATIONS

Domori, "Wire electric discharge machine and method for determining reference position", 2018 (Year: 2018).*
(Continued)

*Primary Examiner* — Brian W Jennison
*Assistant Examiner* — Abigail H Rhue
(74) *Attorney, Agent, or Firm* — Maginot, Moore & Beck LLP (57) ABSTRACT

Method for scanning a workpiece surface (2A) of a metal workpiece (2), in which a blowtorch (3) having a welding wire electrode (4) is moved relative to the workpiece surface (2A) to determine scanning values and a wire end (4A) of the welding wire electrode (4) is repeatedly moved towards the workpiece surface (2A), in each case until contact with the metal workpiece (2) at a scanning position (P) on the workpiece surface (2A) of the metal workpiece (2) is detected, and the wire end (4A) of the welding wire elec- (Continued)

trode (4) is subsequently moved back, the blowtorch (3) detecting scanning values (d) at scanning positions (P), at least in some cases multiple times, to determine scanning measurement errors.

17 Claims, 5 Drawing Sheets

(56) References Cited

U.S. PATENT DOCUMENTS

| | | | |
|---|---|---|---|
| 6,044,308 | A | 3/2000 | Huissoon |
| 6,356,807 | B1 | 3/2002 | McGee et al. |
| 9,833,857 | B2 * | 12/2017 | Artelsmair ............ B23K 9/1278 |
| 2002/0011474 | A1 | 1/2002 | Sasano |
| 2006/0157533 | A1 | 7/2006 | Onoue et al. |
| 2006/0163230 | A1 | 7/2006 | Kaufman |
| 2011/0089146 | A1 * | 4/2011 | Takahashi ............. B23K 11/115 219/91.2 |
| 2017/0050258 | A1 * | 2/2017 | Hillen ..................... B23K 9/295 |
| 2018/0065204 | A1 * | 3/2018 | Burrows ................. B25J 11/007 |
| 2019/0047068 | A1 * | 2/2019 | Magnasco ............ B23K 26/032 |

FOREIGN PATENT DOCUMENTS

| | | | |
|---|---|---|---|
| CN | 105658367 A | | 6/2016 |
| DE | 19507227 C1 | | 7/1996 |
| DE | 19809589 A1 | | 9/1999 |
| EP | 0638781 A1 | | 2/1995 |
| EP | 0 655 301 B1 | | 6/1998 |
| EP | 1 681 121 A2 | | 7/2006 |
| EP | 1 440 286 B1 | | 2/2013 |
| JP | 2003225765 A | | 8/2003 |
| JP | 2007090390 A | * | 4/2007 |
| JP | 2007090390 A | | 4/2007 |
| JP | 2009291812 A | | 12/2009 |
| JP | 2011206829 A | | 10/2011 |
| WO | 2012094689 A1 | | 7/2012 |
| WO | 2015165062 A1 | | 11/2015 |
| WO | WO-2018092196 A1 | * | 5/2018 ............... B23H 7/26 |

OTHER PUBLICATIONS

Machine translation of JP-2007090390: Murayama, "Welding method of rippled web beam", 2007 (Year: 2007).*

International Search Report corresponding to international application No. PCT/EP2018/066798 dated Sep. 13, 2018 (13 pages).

* cited by examiner

METHOD AND DEVICE FOR SCANNING A WORKPIECE SURFACE OF A METAL WORKPIECE

This application is a 35 U.S.C. 371 National Stage application of PCT/EP2018/066798, filed Jun. 22, 2018, and claims priority to European Application No. EP 17177839.2, filed on Jun. 26, 2017. The entire contents of the above-mentioned patent applications are incorporated herein by reference as part of the disclosure of this U.S. application.

The invention relates to a method and a device for scanning a workpiece surface of a metal workpiece by means of a welding wire electrode.

Conventional scanning systems are known in which, by mechanical movement of a piece of wire relative to a workpiece surface of a workpiece, the workpiece surface is scanned and measured. The piece of wire of a conventional scanning system of this type can be moved forwards and backwards repeatedly using drive rollers. As soon as contact of a wire end of the piece of wire with the workpiece surface of the workpiece is detected, the wire end of the piece of wire is moved back. In this forwards and backwards movement of this piece of wire, high acceleration forces may occur, in particular when the wire end meets the workpiece surface. Moreover, compressive forces brought about by the drive rollers act on the mechanically moved piece of wire. The contact forces which act on the piece of wire used for measuring lead to abrasion of the wire surface, in particular in wires consisting of relatively soft material, for example in aluminium wires or the like. These wires can deform under pressure, in such a way that the gripping forces applied by the drive rollers increasingly subside. The high accelerations and the surface abrasion result in slippage between the wire used for scanning or measuring and the drive rollers, compromising the measurement results when the workpiece surface of the workpiece is scanned. The measurement results are thus distorted or compromised as a result of the wear on the piece of wire used for measurement or scanning.

Therefore, an object of the present invention is to provide a method and a device for scanning a workpiece surface of a workpiece for which the measurement accuracy is increased.

This object is achieved according to the invention by a method having the features set out in claim 1 and by a scanning device having the features set out in claim 17.

Accordingly, in a first aspect, the invention provides a method for scanning a workpiece surface of a metal workpiece, in which a blowtorch having a welding wire electrode is moved relative to the workpiece surface to determine scanning values and a wire end of the welding wire electrode is repeatedly moved towards the workpiece surface, in each case until contact with the metal workpiece at a scanning position on the workpiece surface of the metal workpiece is detected, and the wire end of the welding wire electrode is subsequently moved back, the blowtorch detecting scanning values at scanning positions, at least in some cases multiple times, to determine scanning measurement errors.

In one possible embodiment of the method according to the invention, the wire end of the welding wire electrode projects out of the blowtorch and is moved forwards and backwards with an adjustable movement profile and/or an adjustable movement frequency.

In a further possible embodiment of the method according to the invention, the blowtorch having the welding wire electrode is moved on a scanning path relative to the workpiece surface of the metal workpiece to determine first scanning values at scanning positions and subsequently on the same scanning path to determine second scanning values at the scanning positions.

In one possible embodiment of the method according to the invention, the first scanning values determined along the scanning path and the second scanning values determined along the scanning path are compared to determine scanning measurement errors.

In a further possible embodiment of the method according to the invention, the welding wire electrode is conveyed by drive rollers as a function of the determined scanning measurement errors to reduce scanning measurement errors.

In a further possible embodiment of the method according to the invention, a movement of the welding wire electrode is detected to monitor a force transmission exerted on the welding wire electrode by drive rollers at a contact point of a wire surface of the welding wire electrode.

In a further possible embodiment of the method according to the invention, a surface abrasion brought about by the drive rollers at the contact point of the wire surface of the welding wire electrode is automatically detected on the basis of the detected wire movement of the welding wire electrode, and the welding wire electrode is conveyed to a different contact point by the drive rollers to reduce resulting scanning measurement errors. This can be achieved by changing the distance between the blowtorch and the workpiece surface. Likewise, the welding wire electrode can be conveyed further out of the blowtorch and cut to length.

In a further possible embodiment of the method according to the invention, the drive rollers provided for conveying the welding wire electrode are driven by an electric motor, the motor speed and/or motor current signal of which are monitored to detect the wire movement of the welding wire electrode.

In a further possible embodiment of the method according to the invention, a surface abrasion of the wire surface of the welding wire electrode, brought about by the drive rollers at a contact point of the welding wire electrode, is detected from a distinctive noise in a motor speed signal and/or in the motor current signal.

In a further possible embodiment of the method according to the invention, after a predetermined scanning operating time elapses, after a predetermined scanning distance is achieved and/or after a predetermined number of scanning values is achieved, the welding wire electrode projecting from the blowtorch and used for scanning the workpiece surface is conveyed out of the blowtorch by a predetermined length and cut to length.

In a further possible embodiment of the method according to the invention, after surface abrasion of the wire surface of the welding wire electrode is detected, the welding wire electrode projecting out of the blowtorch and used for scanning the workpiece surface is conveyed out of the blowtorch by a predetermined length and cut to length.

In a further possible embodiment of the method according to the invention, mechanical contact of the wire end of the welding wire electrode with the workpiece surface of the workpiece is detected electrically.

In a further possible embodiment of the method according to the invention, mechanical contacting of the workpiece surface by the wire end of the welding wire electrode is detected by evaluating a motor speed signal and/or a motor current signal of the electric motor provided for driving the drive rollers.

In a further possible embodiment of the method according to the invention, a movement profile and/or a movement frequency of the welding wire electrode are adjusted as a function of a material of the welding wire electrode.

In a further possible embodiment of the method according to the invention, the wire end of the welding wire electrode forms a tool reference point, which is calibrated by means of a calibrating body to reduce scanning measurement errors.

In a further possible embodiment of the method according to the invention, the electrical voltage applied to the wire end of the welding wire electrode is set to a defined value before the workpiece surface is scanned, and during the scanning of the workpiece surface of the workpiece the electric voltage is applied, unregulated, to the wire end of the welding wire electrode, in such a way that, after electric contact of the wire end with the workpiece surface is detected from the electric current (I) flowing as a result of an electric short circuit, the thermal stress on the welding wire electrode is kept low. The low thermal stress during an electric short circuit can be achieved by way of a high internal resistance of the unregulated voltage source.

In a further aspect, the invention further provides a scanning device for a welding apparatus for scanning a workpiece surface of a metal workpiece, the scanning device being suitable for moving a blowtorch having a welding wire electrode relative to the workpiece surface to be scanned of the workpiece to determine scanning values, and in doing so repeatedly moving a wire end of the welding wire electrode initially towards the workpiece surface, in each case until contact with the metal workpiece at a scanning position on the workpiece surface of the metal workpiece is detected, and subsequently moving the wire end of the welding wire electrode back, the blowtorch detecting scanning values at scanning positions on the workpiece surface of the metal workpiece, at least in some cases multiple times, to determine scanning measurement errors automatically.

Hereinafter, possible embodiments of the method according to the invention and the device according to the invention for scanning a workpiece surface of a metal workpiece are described in detail with reference to the accompanying drawings, in which.

Figure 1:
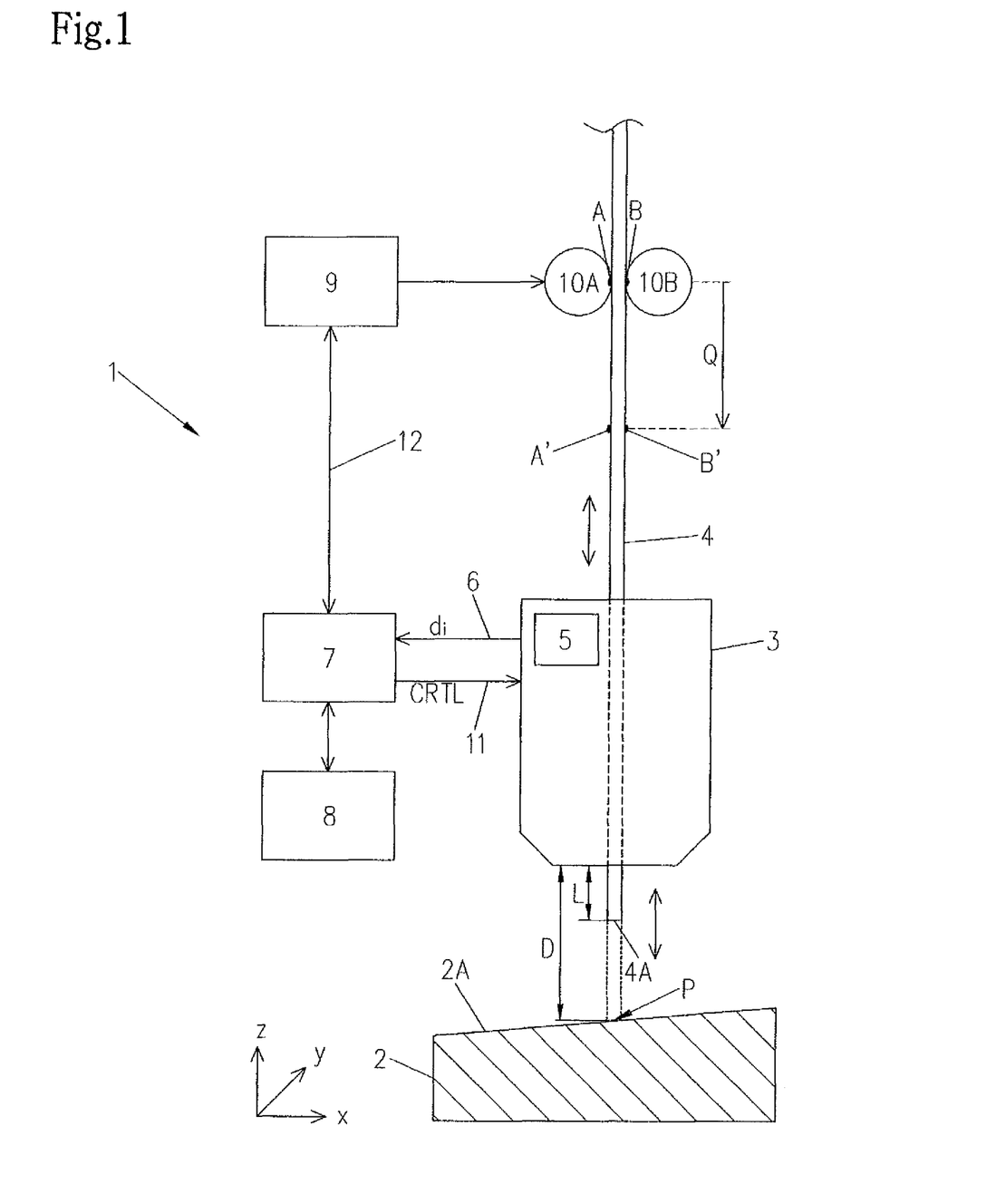
FIG. 1 is a schematic drawing of a possible embodiment of a scanning device according to the invention for scanning a workpiece surface.

FIG. 1 shows a possible embodiment of a scanning device 1 according to the invention for scanning a workpiece surface. The scanning device 1 shown in FIG. 1 can be used for scanning a workpiece surface 2A of a metal workpiece 2. In one possible embodiment, the scanning device 1 according to the invention is used in a welding apparatus. This welding apparatus has a blowtorch 3. A welding wire electrode 4 is supplied to this blowtorch 3. The scanning device 1 is suitable for moving the blowtorch 3 of the welding wire electrode 4 relative to the workpiece surface 2A of the workpiece 2 to determine scanning values, a wire end 4A of the welding wire electrode 4 being repeatedly moved towards the workpiece surface 2A of the workpiece, in each case until contact with the metal workpiece 2 at a scanning position on the workpiece surface 2A of the metal workpiece 2 is detected, and the wire end 4A of the welding wire electrode 4 subsequently being moved back. A blowtorch with a push/pull drive for carrying out the forwards and backwards movement of the welding wire electrode 4 is particularly suitable for a scanning device of this type. In this case, scanning values d at scanning positions P are detected automatically, at least in some cases multiple times, to determine scanning measurement errors. As can be seen in FIG. 1, the supplied welding electrode 4 projects out of the blowtorch 3 as far as the wire end 4A over a stick-out length L. The distance between the blowtorch 3 and the workpiece surface 2A of the workpiece 2 is the distance D, as visible in FIG. 1. In the coordinate system likewise shown in FIG. 1, the welding wire electrode 4 is moved forwards and backwards substantially in the z-direction, in other words substantially perpendicular to the workpiece surface 2A of the workpiece 2. As a result of the substantially perpendicular movement direction of the welding wire electrode 4 with respect to the workpiece surface 2A, bending of the wire can be minimised. Nevertheless, other movement directions of the welding wire electrode 4 are also adjustable by pivoting the blowtorch 3. The wire end 4A of the welding wire electrode 4 is repeatedly moved initially towards the workpiece surface 2A with respect to the workpiece surface 2A, until contact with the metal workpiece 2 at a particular scanning position is detected, and subsequently the wire end 4A of the welding wire electrode 4 is moved backwards away from the workpiece surface 2A. The blowtorch 3 detects scanning values d at scanning positions P on the workpiece surface 2A of the metal workpiece 2 multiple times to determine scanning measurement errors automatically. The scanning values d specify a surface profile of the workpiece surface 2A. To determine absolute positions of the surface profile, the stick-out length L has to be known before the start of the scanning process. This can be achieved for example using a calibration device, which cuts the welding wire electrode 4 to length at a defined distance from the blowtorch 3. For a known stick-out at the start of the scanning process, the scanning values d can be determined on the basis of the movement profile of the welding wire electrode 3 and the detection of the contact of the welding wire electrode 3 with the workpiece surface. Using the known absolute position of the blowtorch 3, the surface profile of the workpiece surface 2A can subsequently be created. If the stick-out length L is not known or absolute positions of the surface are not required, relative positions from the first scanning point can be determined.

The wire end 4A of the welding wire electrode 4 projects out of the blowtorch 3 and is moved forwards and backwards, in other words substantially in the z-direction, as indicated schematically in FIG. 1, with an adjustable movement profile and/or an adjustable movement frequency.

Figure 3:
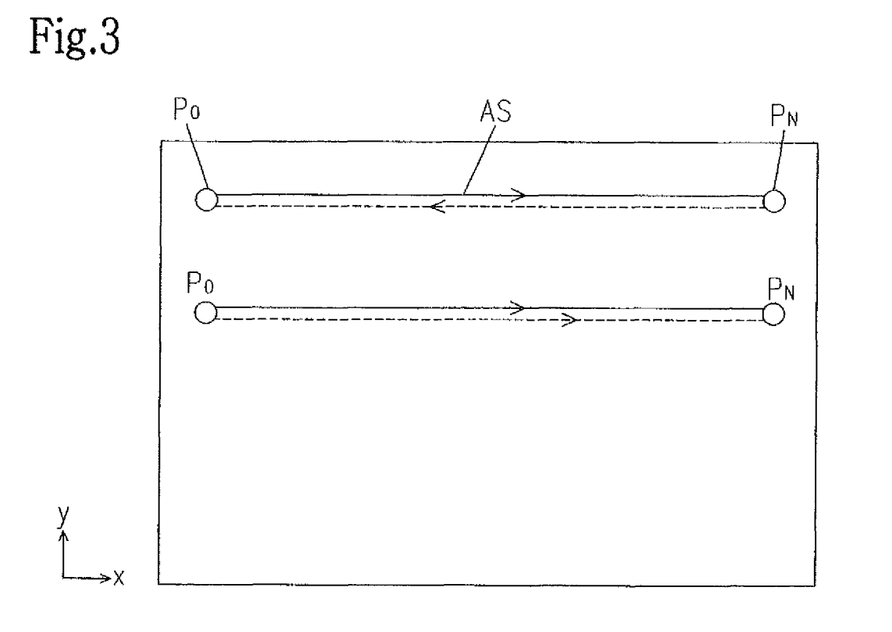
FIG. 3, 4 are schematic drawings of possible example scanning paths which can be used in the method according to the invention for scanning a workpiece surface.

The blowtorch 3 of the welding apparatus is moved, together with the welding wire electrode 4 which moves forwards and backwards, on a scanning path AS relative to the workpiece surface 2A of the metal workpiece 2 to determine first scanning values $d_1$ at scanning positions P and subsequently to determine second scanning values $d_2$ at the same scanning positions P. Example scanning paths AS are shown in FIG. 3, 4. In one possible embodiment, the first scanning values $d_i$ determined along the scanning path and the second scanning values $d_i'$ determined along the scanning path which are detected at the same scanning positions are compared to determine scanning measurement errors Δd.

As is shown in FIG. 1, the blowtorch 3 may contain a measurement device 5 which supplies scanning values $d_i$ to a processor or computation unit 7 via a signal line 6. The computation unit 7 has access to a data store 8, in which the scanning values $d_i$ can be stored. In one possible embodiment, the obtained scanning values $d_i$ are stored in the data store 8 together with the coordinates of the scanning position P for further data processing.

In one possible embodiment, the computation unit 7 also serves as a control unit for an electric motor 9 which drives drive rollers 10A, 10B. At contact points A, B, the rotating drive rollers 10A, 10B bring about a force transmission onto the welding wire electrode 4, which is accordingly moved in the longitudinal direction. The control device 7 further controls the movement of the blowtorch 3 via control lines 11. In one possible embodiment, the movement of the blowtorch 3 may take place in accordance with a programmed scanning path AS.

The blowtorch 3 is moved relative to the workpiece surface 2A of the workpiece 2. In one possible embodiment, the workpiece 2 may be rigidly clamped and the blowtorch 3 is moved relative to the workpiece surface 2A in accordance with the programmed scanning path AS. In an alternative embodiment, the blowtorch 3 remains stationary while the clamped workpiece 2 is moved relative to the blowtorch 3. In a further possible embodiment, both the blowtorch 3 and the workpiece 2 are controlled so as to bring about a relative movement between the blowtorch 3 and the workpiece surface 2A of the workpiece 2.

In one possible embodiment, a movement profile and/or a movement frequency of the forwards and backwards movement of the welding wire electrode 4 by way of the drive rollers 10A, 10B are automatically adapted to reduce scanning measurement errors Δd as a function of the scanning measurement errors calculated by the computation unit 7. In particular, by adapting the movement profile and/or movement frequency in the event of scanning measurement errors, the maximum magnitude of the acceleration of the welding wire electrode 4 is reduced. In one possible embodiment, a movement of the welding wire electrode 4 is detected to monitor a force transmission exerted by the drive rollers 10A, 10B on the welding wire electrode 4 at contact points A, B of a wire surface of the welding wire electrode 4. On the basis of the detected wire movement of the welding wire electrode 4, a surface abrasion brought about by the drive rollers 10A, 10B at the contact points A, B of the wire surface of the welding wire electrode 4 is automatically detected, and the welding wire electrode 4 is conveyed to a different contact point by the drive rollers 10A, 10B to reduce resulting scanning measurement errors. In this context, the electric motor 9 for driving the drive rollers 10A, 10B is controlled accordingly by the computation or control unit 7 of the scanning device 1 via control lines 12. The drive rollers 10A, 10B provided for conveying the welding wire electrode 4 are driven by the electric motor 9, the motor speed and/or motor current signal of which is monitored by the control unit 7 in one possible embodiment to detect the wire movement of the welding wire electrode 4. In one possible embodiment, a surface abrasion of the wire surface of the welding wire electrode 4 brought about by the drive rollers 10A, 10B at contact points A, B of the welding wire electrode 4 is detected from a distinctive noise in a motor speed signal and/or in a motor current signal of the electric motor 9. Abrasion of the wire surface of the welding wire electrode 4 can lead to intermittent reduction of the drive force. When this state occurs, this leads to a distinctive noise in the speed signal or current signal of the electric drive 9, since the acceleration forces and component forces suddenly change. In a possible embodiment, this change in the motor speed signal or motor current signal of the electric motor 9 is detected by the control unit 7. The detected distinctive noise in the motor rotational speed signal and/or in the motor current signal points to surface abrasion of the welding wire 4 at the contact points A, B. In one possible embodiment, after surface abrasion of the wire surface of the welding wire electrode 4 is detected, the welding wire electrode 4 projecting out of the blowtorch 3 and used for scanning the workpiece surface 2A is automatically conveyed out of the blowtorch 3 by a predetermined length Q and subsequently cut to length. Alternatively, it is possible to increase the distance between the blowtorch 3 and the workpiece surface 2A. Thus, for example, the distance between the blowtorch 3 and workpiece surface 2A can be increased or decreased continuously along a scanning path AS so as to convey the wire electrode at different points A, B using the drive rollers 10A, 10B. As is schematically shown in FIG. 1, for example the welding wire 4 is moved forwards by a length Q after surface abrasion of the welding wire electrode 4 is detected at the contact points A, B, in such a way that the abraded points or contact points A, B are located at the points A', B' for conveyance, as shown in FIG. 1. After the conveyance, an unused surface of the welding wire electrode 4 is located at the contact points A, B. This unabraded surface of the welding wire electrode 4 reduces the slippage between the drive rollers 10A, 10B and the welding wire electrode 4, and thus increases the precision or accuracy of the determination of the scanning values $d_i$.

In a further possible embodiment of the scanning device 1 according to the invention, after a predetermined scanning operating time elapses, after a predetermined scanning distance is achieved and/or after a predetermined number of scanning values is achieved, the welding wire electrode 4 projecting from the blowtorch 3 and used for scanning the workpiece surface 2A of the workpiece 2 is conveyed out of the blowtorch 3 by a predetermined length and subsequently cut to length. In this embodiment, the contact point between the welding wire electrode 4 and the drive rollers 10A, 10B is changed regularly, in such a way that no excessive surface abrasion can occur at the wire surface of the welding wire electrode 4.

The drive rollers 10A, 10B for conveying the welding wire electrode 4 are controlled by the control unit 7 in such a way that a potential slippage between the wire surface of the welding wire electrode 4 and the drive rollers is minimised. This is helpful in particular in welding wire electrodes 4 which consist of a relatively soft material, for example of aluminium. In one possible embodiment, a potential occurring slippage is detected, for example by evaluating the motor speed signal and/or by evaluating the motor current signal of the electric motor 9 which drives the drive rollers 10A, 10B. Alternatively, the welding wire electrode 4 may automatically be moved to a different contact point at regular intervals so as to prevent abrasion of the welding wire surface pre-emptively.

In a further possible embodiment, a potential occurring slippage can be detected on the basis of the determined scanning values $d_i$. If for example highly varying scanning values d are determined at a scanning position where the blowtorch 3 is located at particular coordinates x, y of the workpiece surface 2A of the workpiece 2, this may be traced back to a slippage occurring between the welding wire electrode 4 and the drive rollers 10A, 10B. If an occurring slippage is detected in this manner, the welding wire electrode 4 is automatically moved to a different contact point and the projecting welding wire end is automatically cut to length so as to undertake the measurement again at the relevant scanning position. Subsequently, it is established whether or not the previous occurring scanning value variance which was traced back to the mechanical slippage is still present. In this variant configuration, the mechanical slippage between the welding wire electrode 4 and the drive rollers 10A, 10B is thus detected by evaluating the scanning values $d_i$ at a scanning position P. In one possible embodiment, the scanning device 1 according to the invention thus has a device for detecting a mechanical slippage between the welding wire electrode 4 and the drive rollers 10A, 10B for conveying the welding wire electrode 4. In one embodiment, this detection device for detecting slippage between a welding wire electrode 4 and drive rollers 10A, 10B is based on the evaluation of a motor speed signal or motor current signal of the electric motor 9 which drives the drive rollers 10A, 10B. In an alternative embodiment, the detection device for detecting slippage between the welding wire electrode 4 and the drive rollers 10A, 10B has an evaluation unit for evaluating scanning values at a scanning position, scanning values at a scanning position which deviate strongly from one another indicating the presence of mechanical slippage brought about by wear on the welding wire electrode surface. To prevent mechanical slippage between the welding wire electrode 4 used for scanning and the drive rollers 10A, 10B, the welding wire 4A may pre-emptively be conveyed to a different contact point at regular intervals.

In one possible embodiment of the scanning device 1 according to the invention, a movement profile and/or movement frequency of the welding wire electrode 4 are adjusted as a function of a material of the welding wire electrode 4. The movement frequency is the frequency of the welding wire electrode 4 in the z-direction, in other words the number of forwards and backwards movements relative to the workpiece surface 2A. Further, the welding wire electrode tip 4A is moved along a scanning path AS in the x- and y-direction in accordance with the movement profile. An electric voltage U present at the wire end 4A of the welding wire electrode 4 can be set to a predefined value before the workpiece surface 2A is scanned. During the scanning of the workpiece surface 2A of the workpiece 2, the electric voltage U is present at the wire end 4A of the welding wire electrode 4, in such a way that, after electric contact of the wire end 4A with the workpiece surface 2A of the workpiece 2 is detected by way of the electric current I flowing as a result of an electric short circuit, a thermal strain on the welding wire electrode 4 is brought about.

During the forwards and backwards movement of the welding wire electrode 4 substantially perpendicular to the workpiece surface 2A, mechanical contact occurs between the wire end 4A of the welding wire electrode 4 and the workpiece surface 2A. In a preferred embodiment, this contact is detected electrically. Since an electric voltage U is present at the welding wire electrode 4, the mechanical contact between the welding wire end 4A and the workpiece surface 2A of the metal workpiece 2 simultaneously leads to electric contact, which is detected. In an alternative embodiment, the contact between the welding wire end 4A of the welding wire electrode 4 and the workpiece surface 2A of the workpiece 2 can also be detected mechanically. This can detected for example by evaluating the wire movement or the forces transmitted to the drive rollers.

To keep the thermal strain on the welding wire electrode 4 due to the current I flowing during the electrical detection as low as possible, in one possible embodiment corresponding measures can be taken, in particular if the current source of the welding apparatus is used to generate the scanning voltage. Initially, it is established whether the welding wire end 4A of the welding wire electrode 4 has touched the component surface or the workpiece surface 2A of the workpiece 2; in other words, it is established whether electric contact has occurred. Once contact has been established, the wire end 4A of the welding wire electrode 4 is conveyed backwards until the detected short circuit is broken. Once the short circuit is terminated or broken, the pulse width of the current signal or voltage signal is reduced to 0% and subsequently increased at regular time intervals until a predetermined voltage is exceeded. For example, the pulse width is increased by 0.1% every 100 µs until a voltage of for example 20 V is reached. The pulse width reached is subsequently stored and used for the remaining process. This cautious approach to the appropriate pulse width may be necessary as a result of component tolerances of the current source of the welding apparatus. The current source of the welding apparatus is generally configured for high powers, but here is used at very low powers, at which the aforementioned component tolerances or example scatterings have a considerable effect on the output voltage. This minimum pulse width, which generates a voltage detectable by the control unit, preferably in the range of 5 V to 30 V, is set and is not changed further during the scanning process. As a result of the internal resistance of the now unregulated current or voltage source, the voltage breaks down in the event of a short circuit, and only a low flow of current is brought about. As a result of this procedure, a minimum pulse width is set at the power unit of the welding apparatus so as to ensure that, during scanning, as low an electric current I as possible flows and no electric arc can occur. As a result, the thermal strain on the welding wire electrode 4 is kept as low as possible, and wear on the welding wire electrode 4 during scanning is thus reduced. In this context, the pulse width is set in such a way that an electric short circuit between the welding wire end 4 of the welding wire electrode and the workpiece surface 2A of the metal workpiece 2 can still be reliably detected.

In a further possible embodiment of the scanning device 1 according to the invention, a special piece of wire which has a wear-resistant surface can be used for the scanning. For example, in one possible embodiment a steel wire may be used for scanning the workpiece surface 2A of the workpiece 2. Subsequently, for the actual welding process, in one possible embodiment a welding wire electrode consisting of a different material, for example aluminium or the like, is used. In one possible variant configuration of the welding apparatus according to the invention, a welding wire electrode 4 for the welding process and in addition a separate scanning electrode for undertaking scanning process can be supplied to the blowtorch 3. This scanning electrode consists for example of a wear-resistant steel wire for scanning the workpiece surface 2A of the workpiece 2. In a preferred embodiment of the scanning device 1, however, the same wire or the same electrode 4 is used both for the scanning process and for the welding process.

If an insulating layer is located on the workpiece surface 2A of the metal workpiece 2, it may occur that an electric short circuit is not detected between the welding wire end 4A and the workpiece surface 2A, since the insulating layer prevents a short circuit of this type. To prevent the drive rollers 10A, 10B from continuing to press the welding wire against the workpiece surface 2A of the workpiece 2 in this case, in one possible embodiment the motor speed signal and/or the motor current signal of the electric motor 9 can be monitored. In a further possible embodiment of the scanning device 1 according to the invention, the controller parameters of the electric motor 9 are adapted or set as a function of the material of the clamped welding wire electrode 4. For example, in a welding wire electrode 4 consisting of a relatively soft material such as aluminium, the scanning frequency of the welding wire electrode 4 is reduced so as to prevent excessively high acceleration forces, which lead to considerable wear on the welding electrode 4 consisting of a soft material. The decrease in the acceleration forces due to the reduced scanning frequency results in reduced wear on the welding wire electrode 4 and thus also in a reduction in a potential mechanical slippage between the surface of the welding wire electrode 4 and the drive rollers 10A, 10B of the scanning device 1.

In one possible embodiment, before and after a scanning process, the blowtorch 3 is stopped at a scanning position and it is checked whether mechanical slippage is present. In one possible embodiment, this is achieved by evaluating the scanning values determined at the scanning position. In one possible embodiment, the determined scanning error is compensated or the detected mechanical slippage is corrected.

In a further possible embodiment of the scanning device 1 according to the invention, the temperature T of the welding wire electrode 4 is monitored. In one possible embodiment, the welding wire electrode 4 is cooled as a function of the monitored wire temperature so as to reduce wear on the welding wire electrode 4 and/or a potential mechanical slippage. In a further possible variant configuration of the scanning device 1 according to the invention, the force transmission to the welding wire electrode 4 can also be monitored, for example the mechanical contact force of the drive rollers 10A, 10B onto the surface of the welding wire electrode 4 at the contact points A, B.

Figure 2:
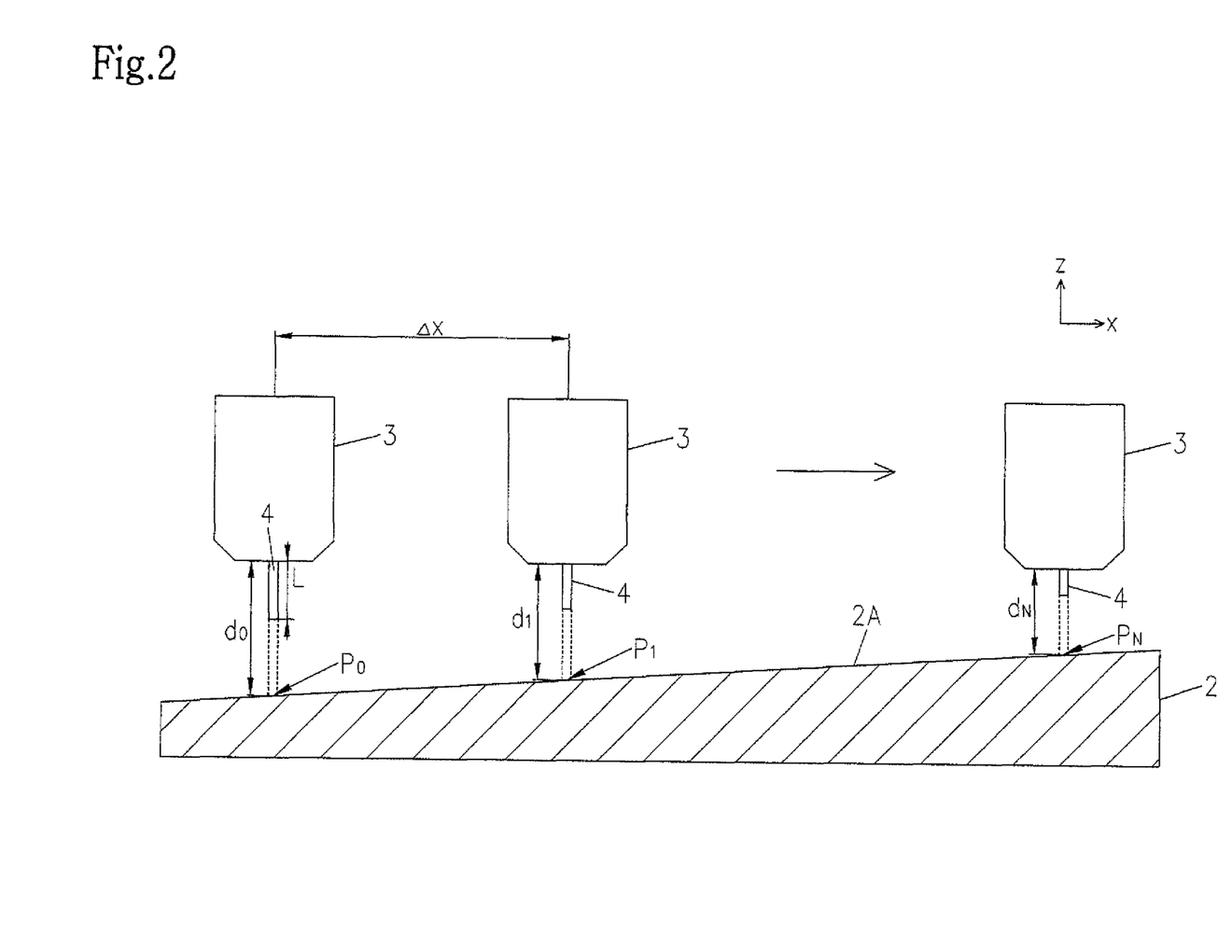
FIG. 2 is a further schematic drawing illustrating the mode of operation of a method according to the invention for scanning a workpiece surface.

FIG. 2 schematically shows the scanning of a workpiece surface 2A of a metal workpiece 2 by the scanning method according to the invention. In the example shown, a blowtorch 3 having a welding wire electrode 4 guided therein is moved relative to the workpiece surface 2A of the workpiece 2 to determine scanning values d relative to the workpiece surface 2A of the workpiece 2. In the example shown, the blowtorch 3 is moved in the x-direction relative to the slightly inclined workpiece surface 2A of the workpiece 2. In the process, the welding wire electrode tip 4A of the welding wire electrode 4 touches the surface of the workpiece 2 at particular intervals $\Delta x$. The touching of the workpiece surface 2A of the workpiece 2 by the welding wire end 4A of the welding wire electrode 4 can be detected for example from an occurring electric short circuit. In the example shown in FIG. 2, scanning values d0, d1, . . . , $d_n$ are detected along the workpiece surface 2A at various scanning positions in the x-direction along a scanning path AS and supplied to the evaluation unit 7 of the scanning device 1. If no mechanical slippage occurs between the welding wire electrode 4 and the drive rollers 10A, 10B, the scanning values $d_i$ correspond to the distance between the blowtorch 3 and the workpiece surface 2A, taking into account the length L by which the welding wire electrode 4 projects out of the blowtorch 3 at the upper end position. However, mechanical slippage can result in measurement errors. To prevent these scanning measurement errors, in the scanning method according to the invention the blowtorch 3 is moved, at least in some cases multiple times, towards one or more scanning positions P so as to detect scanning values d there. The blowtorch 3 detects scanning values d at one or more scanning positions P, at least in some cases multiple times, to determine scanning errors, which may for example be brought about by mechanical slippage. For example, in the simple example of the blowtorch 3 shown in FIG. 2, after the scanning value $d_N$ at the scanning position $P_N$ is determined there is a movement back to the scanning position $P_0$ so as to determine a second scanning value $d_0'$ at the scanning position $P_0$. The blowtorch 3, along with the welding wire electrode 4 moved therein, is moved along a scanning path AS relative to the workpiece surface 2A to determine first scanning values $d_1$ at scanning positions P and subsequently to determine second scanning values $d_2$ at the same scanning positions P. For example, the blowtorch 3 is moved in such a way that it approaches every scanning position twice, so as to obtain two scanning values d, d' for each scanning position P. The two scanning values d, d' obtained at the same scanning position P are compared with one another so as to determine a scanning measurement error $\Delta d$. For example, the second scanning value d' determined during the second approach towards the scanning position is subtracted from the first scanning value d obtained during the first approach towards the scanning position so as to calculate a scanning measurement error $\Delta d$.

$$\Delta d = d_i - d_i'$$

In one possible embodiment, the scanning measurement errors calculated at the different scanning positions P may be used for detecting and correcting a mechanical slippage between the welding wire electrode 4 and the drive rollers 10A, 10B. Further, the determined scanning measurement errors may be evaluated for correcting the scanning values and thus for more precise detection of the workpiece surface 2A of the workpiece 2 by the evaluation unit 7. As a result of the multiple measurements of $\Delta d$, the measurement accuracy can be improved thereafter using a model of the slippage. In a simple model, for example a linear occurrence of slippage is assumed. After the multiple scans, the actual distances $d_i$ and the resulting surface geometry can be back-calculated from the temporal sequence ad the slippage model.

In a further possible embodiment of the method according to the invention, the blowtorch 3 can be moved to a reference scanning position before the actual scanning process is started. Scanning values d can subsequently be determined at the reference scanning position so as to detect scanning measurement errors.

Figure 4:
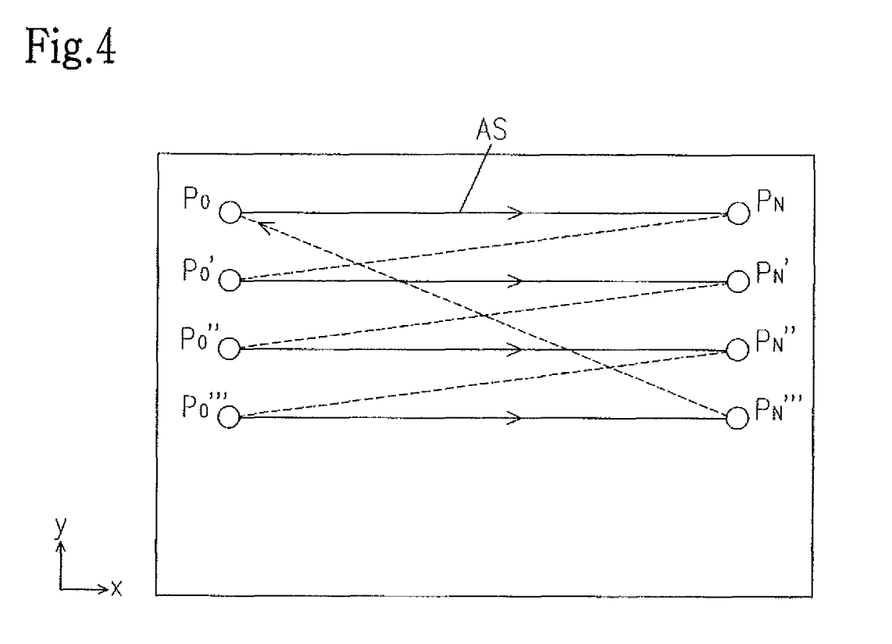

FIG. 3, 4 show, by way of example, possible scanning paths which may be used in the method according to the invention for scanning a workpiece surface 2A of a metal workpiece 2. In the example shown in FIG. 3, for the upper scanning path the blowtorch 3 is moved along a line from an initial scanning position $P_0$ to a final scanning position $P_n$, the wire end 4A of the welding wire electrode 4 being moved forwards and backwards in the z-direction at an adjustable movement frequency f. In this way, n+1 scanning values $d_0$, $d_1$, . . . , $d_N$ can be determined. Once the scanning position $P_N$ is reached, the blowtorch 3 can be moved backwards along the same scanning path, along the upper scanning path in FIG. 3, until it has reached the initial scanning position $P_0$ again. The scanning values d determined during the scanning at various scanning positions can be buffered in pairs in the data store 8 of the scanning device 1 together with the coordinates of the scanning position P. Scanning measurement errors can be derived from the differences $\Delta d$ between the scanning values d, d' detected at the same scanning positions.

For the second, lower scanning path AS shown in FIG. 3, the blowtorch 3 is moved linearly from the initial scanning position $P_0$ into the final scanning position $P_n$ so as to determine scanning values $d_i$. Once the final scanning position $P_n$ is reached, after detecting the scanning value there the blowtorch 3 is moved back into the initial scanning position $P_0$ and moved along the scanning path in the same direction a second time to the final scanning position $P_n$. In this scanning process, the blowtorch 3 is thus moved along the same scanning path AS twice so as to obtain two scanning values d, d' for each scanning position P and calculate scanning measurement errors therefrom.

The number of scanning values obtained at the same scanning position P may vary depending on the application scenario. In one possible embodiment, at least two scanning values are detected at each scanning position P so as to determine scanning measurement errors. In some possible application scenarios, more scanning values may also be detected for each scanning position, so as to determine scanning measurement errors more precisely. In a further possible embodiment, the multiple scans merely take place at a random sample of scanning positions so as to detect scanning measurement errors brought about for example by the wear on a welding wire surface.

In one possible embodiment, the determined scanning measurement errors are recorded in the data store 8. In one possible embodiment, the determined scanning measurement errors can be compared with a predetermined or preconfigured threshold. Once the scanning measurement errors exceed this value, in one possible embodiment the welding wire electrode 4 is automatically moved to another contact point so as to reduce a mechanical slippage which may have occurred. Once the welding wire electrode 4 has been conveyed to another contact point, scanning measurement errors can subsequently be determined again to establish whether or not the measurement error distortion which has occurred has been eliminated.

FIG. 4 shows by way of example a further possible scanning path AS which can be used in the method according to the invention for scanning a workpiece surface 2A. In the example shown in FIG. 4, the blowtorch 3 initially moves linearly from an initial scanning position to a final scanning position $P_N$ and subsequently jumps to a scanning position $P_0'$ for the next scan line. After reaching the end position $P_N'''$ in the last or fourth scan line, the blowtorch 3 jumps back to the initial position $P_0$ and the workpiece surface 2A is scanned a second time so as to determine scanning measurement errors.

Depending on the application scenario, various pre-programmed scanning paths AS can be used, for example line-by-line scanning as in FIG. 4 or other scanning paths, in particular meandering scanning of the workpiece surface 2A. In one possible embodiment, the scanning path AS used can be selected depending on the application scenario. As well as the movement profile or scanning profile AS, the movement frequency f of the welding wire electrode 4 can also be adjusted depending on the application scenario.

Figure 5:
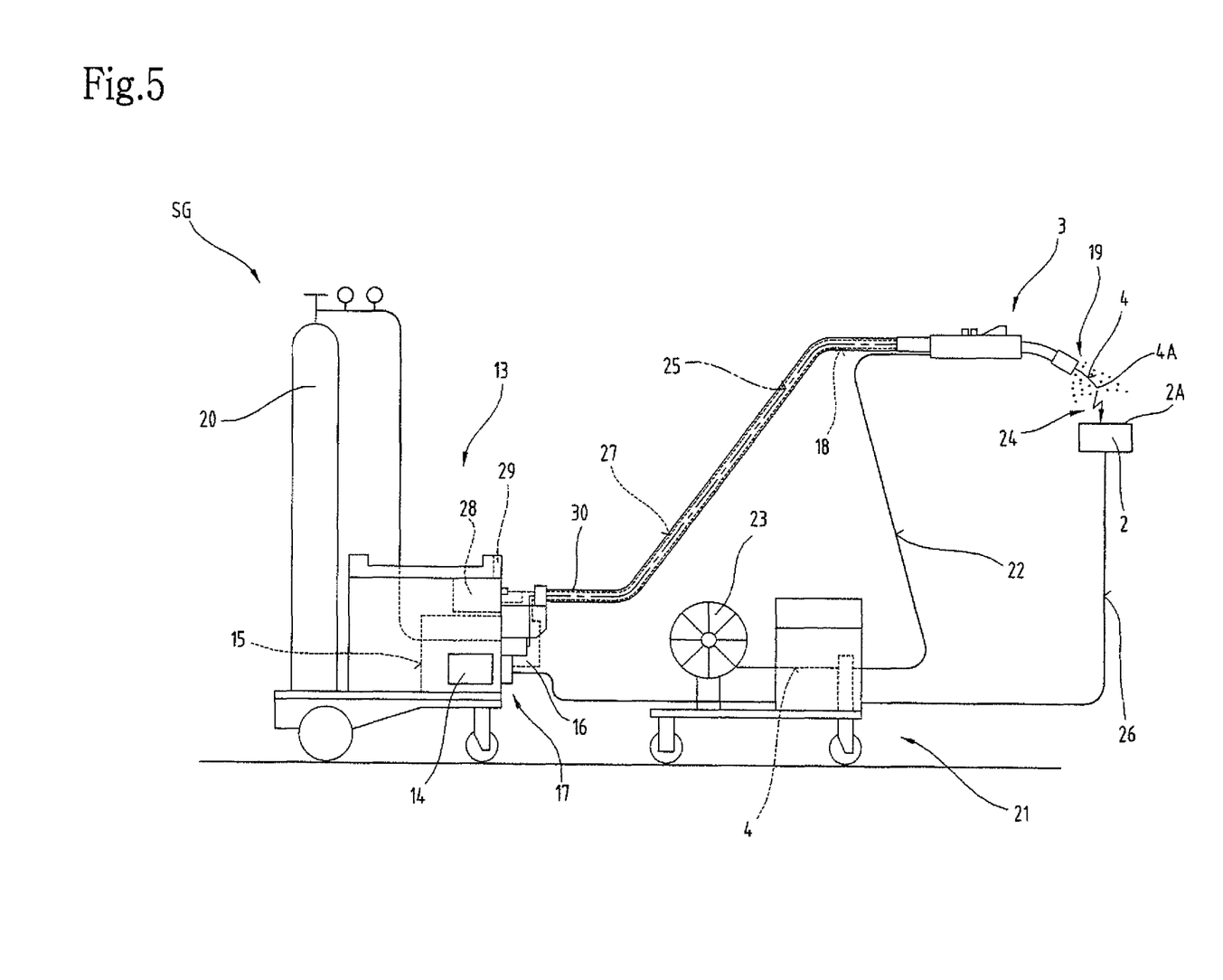
FIG. 5 is a drawing of an embodiment of a welding apparatus in which the method according to the invention for scanning a workpiece surface can be used.

FIG. 5 shows an embodiment of a welding apparatus SG in which the method according to the invention for scanning a workpiece surface 2A of a metal workpiece 2 can be used.

The welding apparatus SG shown in FIG. 5 has a current source 13 comprising a power unit 14. The current source 13 contains a control device 15 comprising a control valve 16. A switching member 17 is connected to the control valve 16. This control valve 16 is arranged in a supply line 18 for a protective gas 19 between a gas store 20 and a blowtorch 3 of the welding apparatus SG.

The welding apparatus SG contains a wire feed apparatus 21, it being possible to supply a welding wire 4 in a reserve drum 23 via a supply line 22, as shown in FIG. 5.

FIG. 5 schematically shows a welding process after a scan of the workpiece surface 2A is complete. The welding wire or welding electrode 4 shown in FIG. 5 has a welding wire end 4A which can be moved forwards and backwards in accordance with the method according to the invention to scan the workpiece surface of the workpiece 2. Once the scanning process is complete, the welding apparatus SG is used for welding. In this context, an electric current for building an arc 24 between the welding wire electrode 4 and the workpiece 2 is supplied to the blowtorch 3 or the welding wire electrode 4 from the power unit 14 of the current source 13 via a welding current line 27. In this context, the workpiece 2 to be welded may be connected to the welding apparatus SG, in particular to the current source thereof, via a further welding line 26, in order for it to be possible to build a circuit for the arc 24. To cool the blowtorch 3, the blowtorch 3 can be connected to a liquid container 28 via a cooling circuit 27.

In the embodiment shown, the welding apparatus SG has an input and/or output device 29 via which different welding parameters and/or modes of operation of the welding apparatus SG can be set. In the embodiment shown in FIG. 5, the blowtorch 3 is connected to the welding apparatus SG via a cable assembly 30. Various lines which connect the welding appliance SG to the blowtorch 3 may be located in the cable assembly 30. In one possible embodiment, components of the scanning device 1 according to the invention are located both in the control device 15 of the welding current source 13 and in the wire feed apparatus 21 of the welding apparatus SG. In one possible embodiment, the electric motor 9 and the drive rollers 10A, 10B for moving the welding wire electrode 4 are provided in the wire feed apparatus 21. In one possible embodiment, the evaluation unit 7 of the scanning device 1 is located in the control unit 15 of the welding apparatus SG. In one possible embodiment, the blowtorch 3 reports locally determined scanning values to the control or evaluation unit 7 of the scanning device 1 via a signal line 6, which for example extends in the cable assembly. In one possible embodiment, the control unit 7 of the scanning device 1 can control the movement of the blowtorch 3 of the welding apparatus SG. For this purpose, the blowtorch 3 may be located in a controllable robot arm of the welding apparatus SG or welding system.

The welding apparatus SG shown in FIG. 5 is suitable not only for welding, but also for scanning a workpiece surface 2A of the workpiece 2. In one possible embodiment, this scanning can be undertaken before the actual welding process is carried out. In one possible embodiment, the welding apparatus SG can be set in an operating mode for undertaking scanning via the input and output device 29. In this scanning operating mode of the welding apparatus SG, the welding wire electrode 4 is used for scanning the workpiece 2 and not for welding.

Figure 6:
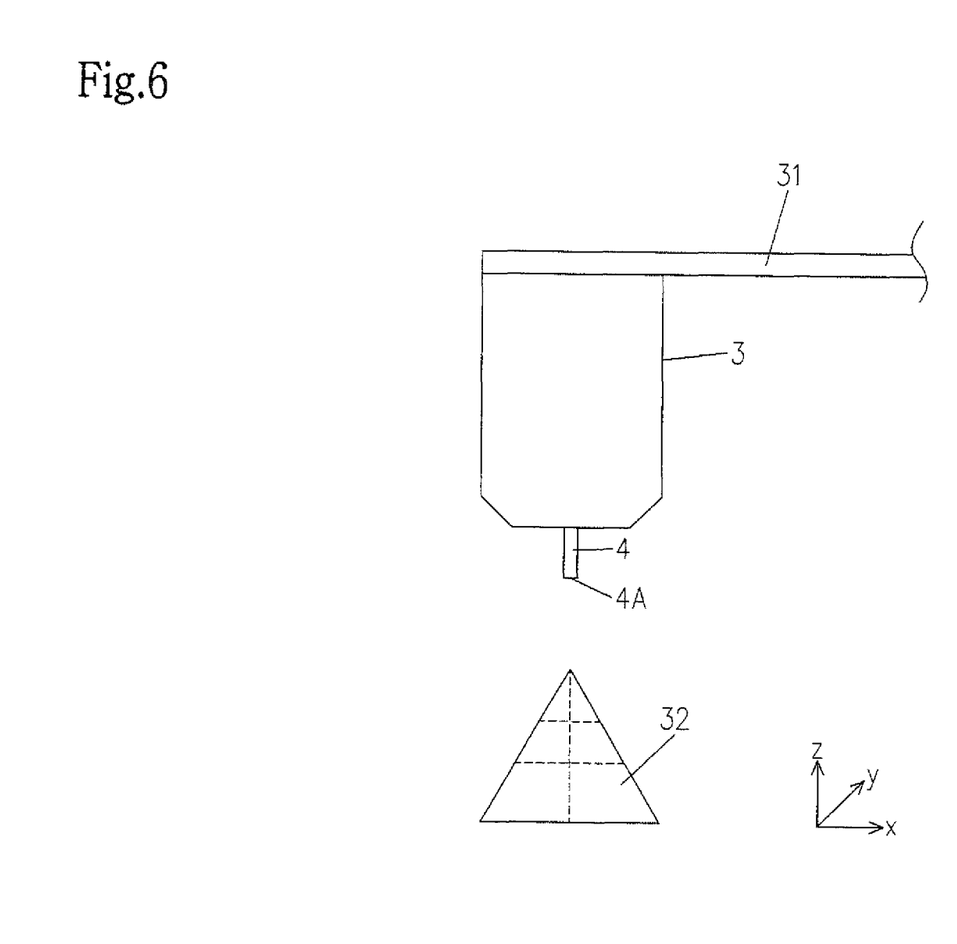
FIG. 6 is a schematic drawing illustrating a calibration process which can be undertaken in a possible embodiment of the method according to the invention.

In one possible embodiment, the blowtorch 3 is located on a robot arm 31, as shown schematically in FIG. 6. The wire end 4A of the welding wire electrode 4 forms a tool reference point TCP. As shown in FIG. 6, this tool reference point TCP can be calibrated using a calibrating body 32 to reduce scanning measurement errors. In the embodiment shown in FIG. 6, the calibrating body 32 is formed conical. The conical calibrating body 32 shown in FIG. 6 is scanned by the scanning device 1 to calibrate the tool reference point TCP. For example, the conical scanning body 32 is scanned along a circle at various heights Z. If the measured height Z remains constant, the tool reference point TCP is calibrated correctly. The tool reference point TCP is preferably calibrated at the calibration face of a reference or calibration body 32. The calibration is preferably carried out before the scanning process for scanning the workpiece surface 2A begins. After successful calibration of the tool reference point TCP, the workpiece surface 2A in particular of a metal workpiece 2 is subsequently scanned. Using the scanning method according to the invention, the component surface of the workpiece 2 can be measured. For example, a position of a particular workpiece 2 can be accurately determined. In particular for a known position of the calibrating body 32, the absolute position of the workpiece surface 2A can be determined in that the workpiece surface 2A is determined relative to the calibration body 32. Further, the position or arrangement of two different workpieces 2 relative to one another can also be determined. For example, a cavity or gap present between two components or workpieces 2 to be welded can be measured by the scanning method according to the invention, and subsequently the two workpieces can be welded together at this point. In one possible application scenario, for example a gap present between two components is scanned or measured before the welding process is carried out, and subsequently, in a subsequent welding process in accordance with the determined measurement data, the two components are welded together. In the scanning method according to the invention, possible scanning errors are detected and preferably compensated or corrected. As a result, the accuracy of the scanning or calibration of the workpiece surface 2A and/or of cavities between workpieces 2 is high, and so the quality of a subsequently produced weld connection can be increased. Using the scanning method according to the invention, for example component tolerances of workpieces 2 can be detected and compensated. With the method according to the invention, the wear on the welding wire electrode 4 using during scanning is minimised, and thus the measurement results when the workpiece 2 is measured are improved. Further, it is possible to scan the weld seam which occurs during the welding process using the scanning device 1 so as to obtain information about the quality thereof.

The invention claimed is:

1. A method for scanning a workpiece surface of a metal workpiece prior to performing a welding operation on the workpiece surface, comprising:
    prior to performing a welding operation on the workpiece, moving a blowtorch having a welding wire electrode relative to the workpiece surface to determine scanning values; and
    repeatedly moving a wire end of the welding wire electrode towards the workpiece surface, in each case moving the wire end until contact of the wire end with the metal workpiece at multiple scanning positions on the workpiece surface is detected, and then moving the wire end of the welding wire electrode away from the workpiece at the scanning position,
    detecting, by means of the blowtorch, scanning values at the multiple scanning positions, including detecting scanning values multiple times at one or more of the multiple scanning positions, to determine scanning measurement errors in the scanning values.

2. The method according to claim 1, wherein the wire end of the welding wire electrode projects out of the blowtorch and is moved forwards and backwards with at least one of an adjustable movement profile and an adjustable movement frequency.

3. The method according to claim 1, wherein the blowtorch having the welding wire electrode is moved on a scanning path relative to the workpiece surface of the metal workpiece to determine first scanning values at scanning positions and subsequently on the same scanning path to determine second scanning values at the scanning positions.

4. The method according to claim 3, wherein the first scanning values determined along the scanning path and the second scanning values determined along the scanning path are compared to determine scanning measurement errors.

5. The method according to claim 1, wherein the welding wire electrode is conveyed by drive rollers as a function of the determined scanning measurement errors to reduce scanning measurement errors.

6. The method according to claim 1, wherein the welding wire electrode is conveyed by drive rollers and a movement of the welding wire electrode is detected to monitor a force transmission exerted on the welding wire electrode by the drive rollers at a contact point of a wire surface of the welding wire electrode.

7. The method according to claim 6, wherein a surface abrasion brought about by the drive rollers at the contact point of the wire surface of the welding wire electrode is automatically detected on the basis of the detected wire movement of the welding wire electrode, and the welding wire electrode is conveyed to a different contact point by the drive rollers to reduce resulting scanning measurement errors.

8. The method according to claim 1, wherein the welding wire electrode is conveyed by drive rollers driven by an electric motor, in which at least one of the motor speed and a motor current signal is monitored to detect the wire movement of the welding wire electrode.

9. The method according to claim 1, wherein the welding wire electrode is conveyed by drive rollers and a surface abrasion of the wire surface of the welding wire electrode, brought about by the drive rollers at a contact point of the welding wire electrode, is detected from a distinctive noise in at least one of a motor speed signal a motor current signal.

10. The method according to claim 1, wherein, after one or more of a predetermined scanning operating time elapses, a predetermined scanning distance is achieved and a predetermined number of scanning values is achieved, the welding wire electrode projecting from the blowtorch and used for scanning the workpiece surface is conveyed out of the blowtorch by a predetermined length and then cut to length.

11. The method according to claim 1, wherein, after surface abrasion of the wire surface of the welding wire electrode is detected, the welding wire electrode projecting out of the blowtorch and used for scanning the workpiece surface is conveyed out of the blowtorch by a predetermined length and then cut to length.

12. The method according to claim 1, wherein mechanical contact of the wire end of the welding wire electrode with the workpiece surface of the workpiece is detected electrically.

13. The method according to claim 1, wherein mechanical contacting of the workpiece surface by the wire end of the welding wire electrode is detected by evaluating at least one of a motor speed signal and a motor current signal of the electric motor provided for driving the drive rollers.

14. The method according to claim 1, wherein at least one of a movement profile and a movement frequency of the welding wire electrode are is adjusted as a function of a material of the welding wire electrode.

15. The method according to claim 1, wherein the wire end of the welding wire electrode forms a tool reference point, TCP, which is calibrated by means of a calibrating body to reduce scanning measurement errors.

16. The method according to claim 1, wherein an electrical voltage applied to the wire end of the welding wire electrode is set to a defined value before the workpiece surface is scanned, and during the scanning of the workpiece surface of the workpiece the electric voltage is applied, unregulated, to the wire end of the welding wire electrode, in such a way that, after electric contact of the wire end with the workpiece surface is detected from an electric current flowing as a result of an electric short circuit, the thermal stress on the welding wire electrode is kept low.

17. A scanning device for a welding apparatus for scanning a workpiece surface of a metal workpiece, wherein the scanning device is suitable for moving a blowtorch having a welding wire electrode relative to the workpiece surface to be scanned of the workpiece to determine scanning values, and in doing so repeatedly moving a wire end of the welding wire electrode initially towards the workpiece surface, in each case until contact with the metal workpiece at a scanning position on the workpiece surface of the metal workpiece is detected, and subsequently moving the wire end of the welding wire electrode back, wherein the scanning device is configured and operable to detect scanning values at scanning positions on the workpiece surface of the metal workpiece multiple times to determine scanning measurement errors in the scanning values automatically.

* * * * *